US007112450B2

(12) United States Patent
Fagrell et al.

(10) Patent No.: US 7,112,450 B2
(45) Date of Patent: Sep. 26, 2006

(54) METHOD FOR PERFORMING MULTIPLE CHEMICAL REACTIONS AND A KIT AND SYSTEM THEREFOR

(75) Inventors: Magnus Fagrell, Uppsala (SE); Jacob Westman, Vänge (SE)

(73) Assignee: Personal Chemistry I Uppsala AB, Uppsala (SE)

( * ) Notice: Subject to any disclaimer, the term of this patent is extended or adjusted under 35 U.S.C. 154(b) by 335 days.

(21) Appl. No.: 09/849,489

(22) Filed: May 7, 2001

(65) Prior Publication Data

US 2002/0013000 A1    Jan. 31, 2002

(30) Foreign Application Priority Data

May 8, 2000    (DK) ............................... 2000 00759

(51) Int. Cl.
*G01N 1/10* (2006.01)
(52) U.S. Cl. .................... 436/180; 436/34; 436/35; 436/37; 436/174; 436/179
(58) Field of Classification Search ............... 700/268; 422/62, 67, 186
See application file for complete search history.

(56) References Cited

U.S. PATENT DOCUMENTS

| 5,714,127 A |   | 2/1998  | DeWitt et al. |         |
|-------------|---|---------|---------------|---------|
| 5,800,784 A |   | 9/1998  | Horn          |         |
| 5,880,972 A | * | 3/1999  | Horlbeck      | 702/27  |
| 5,932,075 A |   | 8/1999  | Strauss et al.|         |
| 6,017,496 A |   | 1/2000  | Nova et al.   |         |
| 6,044,212 A |   | 3/2000  | Flavin et al. |         |
| 6,136,274 A |   | 10/2000 | Nova et al.   |         |
| 6,253,168 B1| * | 6/2001  | Griffey et al.| 703/12  |

FOREIGN PATENT DOCUMENTS

| EP | 0 818 744 A2     |   | 1/1998  |
| EP | 0818744 A2       | * | 1/1998  |
| WO | WO 90/03840      |   | 4/1990  |
| WO | WO 9003840 A1    | * | 4/1990  |
| WO | WO 97/27559      |   | 7/1997  |
| WO | WO 98/15825      |   | 4/1998  |
| WO | WO 9815825 A2    | * | 4/1998  |
| WO | WO 00/36880      |   | 6/2000  |
| WO | WO 200036880 A2  | * | 6/2000  |
| WO | WO0054166        |   | 9/2000  |
| WO | WO 00/72956 A1   |   | 12/2000 |

(Continued)

OTHER PUBLICATIONS

Wolman, Y. "Chemical reaction databases", Online Information-International Meeting, Dec. 1995, 19th International meeting, Issue 19, pp. 157-161.

(Continued)

*Primary Examiner*—Jill Warden
*Assistant Examiner*—Dwayne K. Handy
(74) *Attorney, Agent, or Firm*—Harness, Dickey & Pierce

(57) ABSTRACT

The present invention relates to conducting a plurality of chemical reactions in a system including an apparatus which provides energy for the chemical reactions, such as chemical reactions in organic synthesis, where a particular advantage is the use of predetermined reaction parameters corresponding to similar chemical reactions. The present invention also relates to a system for performing said method and to corresponding kits and software. The system comprises an apparatus which can provide energy for the chemical reactions, said apparatus comprising a reaction cavity and a liquid handler, and a parameter selecting unit having a user interface means, a search unit means, apparatus control unit means, and storage means for carrying a database.

11 Claims, 3 Drawing Sheets

FOREIGN PATENT DOCUMENTS

WO      WO 200072956 A1 * 12/2000

OTHER PUBLICATIONS

Figure 1:
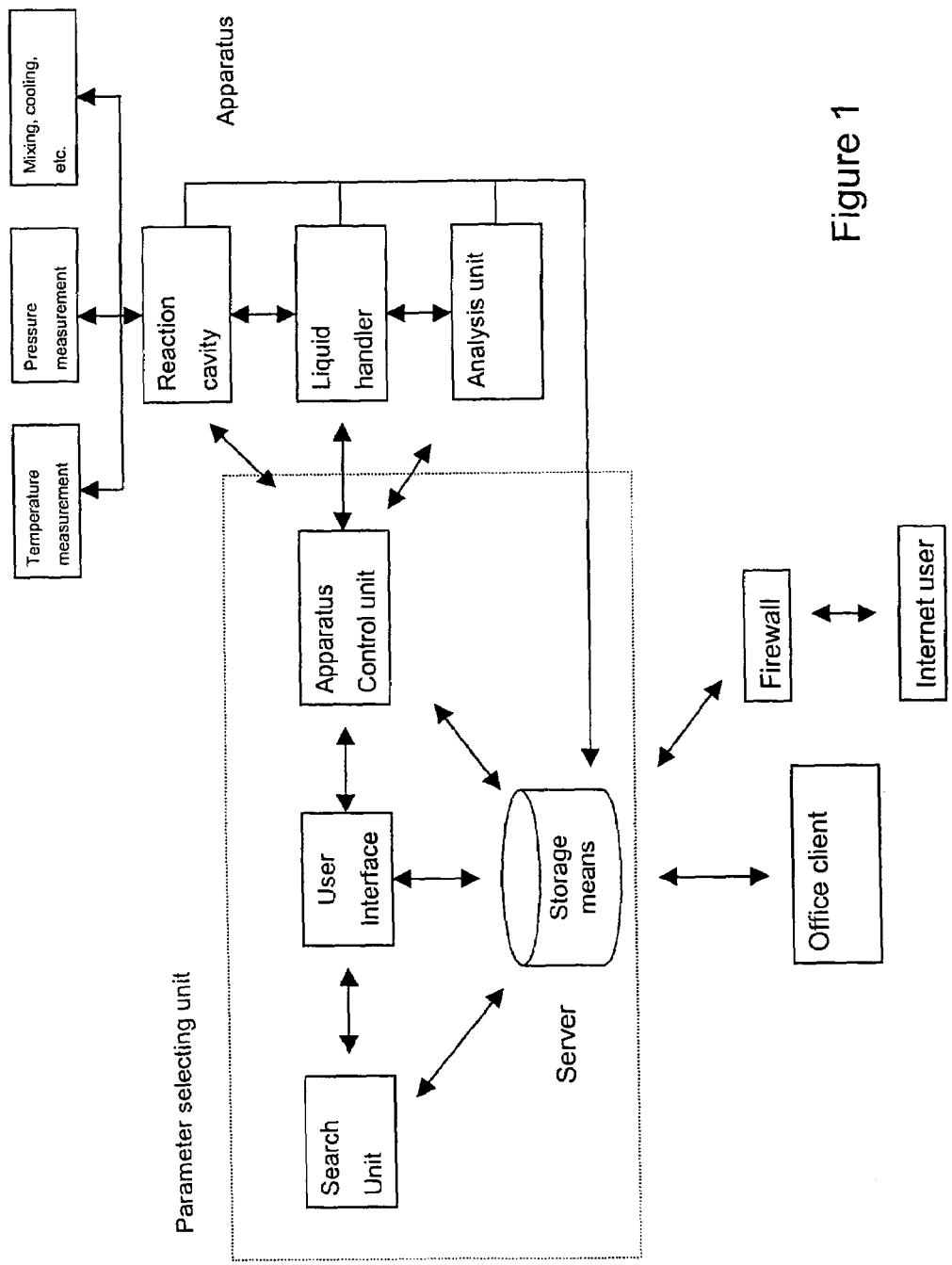

Jayward, Julian. "Chemical reaction databases: progress in reaction searching", Online Information-International Meeting, Dec. 1995, 19th International meeting, Issue 19, pp. 144-156.

"Reaction Databases for Synthetic Leads", 1998.

Cablewski, Teresa et al., "Development and application of a continuous . . . ", J. Org. Chem., (1994)59, p. 3408-3412.

Raner, Kevin D. et al., "A new microwave reaction . . . " J. Org. Chem., (1995)60, p. 2456-2460.

Larhed, Mats et al., "Microwave-assisted high speed . . . ", DDT, (Apr. 2001)vol. 6, No. 8, p. 406-416.

* cited by examiner

US 7,112,450 B2

METHOD FOR PERFORMING MULTIPLE CHEMICAL REACTIONS AND A KIT AND SYSTEM THEREFOR

FIELD OF THE INVENTION

The present invention relates to a method for conducting a plurality of chemical reactions in a system including an apparatus which provides energy for the chemical reaction, where a particular advantage is the use of predetermined reaction parameters corresponding to similar chemical reactions. The present invention also relates to kits and a system for performing said method.

BACKGROUND OF THE INVENTION

Automated synthesis and diagnostic processes has met increasing interest in the last decades. In view of the need for standardised processes yielding product and results of uniform quality, a number of useful systems and methods for synthesis and diagnostic processes have been developed. A wide range of systems are commercially available, especially in the field of peptide and oligonucleotide synthesis where standardised synthetic steps can be described in great detail. In peptide and oligonucleotide synthesis standard protocols have been developed so that synthesis thereof can be effected in an automated manner.

A field of great interest is the field of development of novel organic compounds, e.g. novel drug candidates. Some of the major obstacles for an organic chemist today are the time consumed, the complexity, and the search for efficient routes in organic synthesis. As an example, the average performance some ten years ago was around 25–50 complete substances per chemist a year in the pharmaceutical industry, resulting in an equal amount of new chemical entities as potential new drug candidates. Today the figure is close to 100's per year and will soon be expected to be in the region of 1000's per year per day.

Thus, the challenges for the pharmaceutical industry and the organic chemist include identification of ways of reducing time in the drug development, identification of ways of creating chemical diversity, development of new synthesis routes and reintroduction of old "impossible" synthetic routes. Also, it is a constant challenge to reach classes of totally new chemical entities.

Microwaves assisted chemistry offers a way of providing solutions to at least some of the above problems, namely by speeding up the reaction time with orders of magnitude, improving the yield of chemical reactions, offering higher purity of the resulting product due to rapid heating and thereby reducing impurities from side reactions, and making reactions which were not considered feasible with conventional thermal heating possible.

However, it has often been considered difficult to select optimal conditions for an organic transformation independent if it is based on conventional methods or the use of microwave dielectric heating in that suitable reaction conditions often are found within a very narrow "window". In particular, it is usually considered quite difficult to determine the most suitable combination of process parameters, e.g. applied power, time, solvent, etc.

Although the organic chemist has knowledge about a wide variety of chemical reaction types, he will, if possible, tend to select familiar reaction types even when totally new chemical entities are to be synthesised. Thus, for the organic chemist, it would be desirable if he could gain access to "novel" reaction types associated with reagents unfamiliar to him in a easy manner. Preferably, the automated synthesis of novel drug candidates and other complex chemical entities should not be limited to "chemistries" developed by the organic chemist operating the system.

There is thus a need for a flexible set-up where the organic chemist can explore a number of reactions without the need for detailed literature studies. This will make it possible for the organic chemist to perform a number of reactions (R reactions) in order to become familiarised with the reaction type. This appears to be especially relevant in the cases where the organic chemist is utilising microwave assisted chemical reactions.

U.S. Pat. No. 5,800,784 describes a chemical treatment cassette for enabling the performance of various complex chemistries with minimal human intervention. It is described that the cassette includes a machine readable code set for identifying the exact chemical treatment protocols required for the samples in the cassette. Thus, the machine readable code set substitutes the manual instructions normally provided to a system so that the cassettes can be processed independent of human intervention. However, in U.S. Pat. No. 5,800,784, the machine readable code set and thereby the exact chemical treatment protocols should still be defined and selected by the user prior to the processing of the samples.

DESCRIPTION OF THE INVENTION

Even in view of the known methods for conducting chemical reactions, there is still a need for a method for conducting a plurality of chemical reactions where the user (chemist or technician) simply by providing information about the chemical structure (or at least the functionality or functionalities involved in the chemical reaction) of one or more substrates (chemical species) and the desired transformation (reaction) is able to have the substrate(s) reacted in the presence of one or more reagents (chemical substances) under potentially feasible conditions in order for the user to be directed to substantially optimal reaction condition. The present invention provides a method which provides the above.

Method of Conducting a Chemical Reaction

The present invention relates to a method of conducting R chemical reactions as defined in claim 1.

Generally, the term "chemical reaction" (as well as the synonymous term "transformation") should be interpreted in the broadest sense. Examples of "chemical reactions" range from (a) the formation of new chemical entities (covalent bond formation) via the reaction of a chemical species with one or more reagents optionally under the influence of a catalyst, over (b) formation of salts (ionic bond formation) (c) to isomerisation/rearrangement of chemical species (d) racemisation of chemical species. The present invention is particularly useful for the formation of new chemical entities (covalent bond formation). For all these types of chemical reactions, an (unknown) optimal set of reaction parameters is believed to exist. The present invention will make it possible for a person to gain access to useful set of reaction parameters and to perform a series (R) desired reaction substantially without the requirement for manual intervention. This is particularly true when the method is facilitated by a kit including predetermined amounts of suitable reactants, catalysts, etc. which may be required or useful for the chemical reaction in question.

The chemical reaction may broadly speaking involve one or more chemical species (jointly designated "B"; e.g. "the starting material(s)"), one or more chemical substances (jointly A; e.g. a reagent) and optionally one or more catalysts (e.g. enzyme(s)) thereby leading to the desired product (D). Said chemical species (e.g. starting material(s)) can be chemical entities in any phase, e.g. solid phase, liquid phase or gas phase, preferably solid phase or gas phase. From the above, it should be understood that the reaction may include two (or more) starting materials (B's), e.g. in the instances where the reaction (transformation) involves the coupling of two chemical species or a condensation reaction involving two or more chemical species. Thus, when used herein, the symbol "B" as well as $^XB$, $^NB$, and the like should be interpreted as covering one or more chemical species, each of which are considered as substrates, that is the chemical species which the user have in hand for the purpose of the overall transformation defined by the user. This will be discussed in detail further below.

Examples of interesting chemical reactions (transformations) within the present context are organic reactions e.g. polymerisation/oligomerisation, esterification, decarboxylation, hydrogenation, dehydrogenation, addition such as 1,3-dipolar addition, oxidation, isomerisation, acylation, alkylation, amidation, arylation, Diels-Alder reactions such as maleinisation and fumarisation, epoxidation, formylation, hydrocarboxylation, hydroboration, halogenation, hydroxylation, hydrometallation, reduction, sulphonation, aminomethylation, ozonolysis, C—C coupling reactions (e.g. Stille, Heck and Suzuki reactions), etc. The system and method according to the invention are especially suited for reactions involving one or more catalysts and for asymmetric organic reactions.

The chemical reaction can take place in a suitable solvent or in neat form. Suitable solvents will, as will be acknowledged by the person skilled in the art, depend on the chemical reactions to be conducted. When a solvent is used in a microwave assisted chemical reaction (that is if the apparatus provides microwave energy for the purpose of heating), it is preferred that the dissipation factor (or loss tangent) of the solvent is greater than about 0.04 at 20° C. Examples of suitable solvents for microwave assisted chemical reactions are acetonitrile, DMF, DMSO, NMP, water, tert-butanol, EtOH, benzonitrile, ethylene glycol, acetone, THF and ionic liquids (see, e.g., WO 00/72956).

With respect to the present description with claims, a chemical reaction can generally be considered as involving one or more chemical species $^XB$ (which may be the selected starting material(s) or substrate(s) for the chemical reaction) and resulting in a reaction product $^XD$ (which is the desired product of the chemical reaction defined by the user). It should furthermore be understood that the reaction product includes a functionality $\delta$ and that the chemical reaction involves one or more functionalities $\beta$ in the $^XB$'s, which are transformed into $\delta$ in $^XD$. The prefix "X" indicates that the symbols B and D are associated and they represent the chemical reaction for which the reaction parameters are to be found (yet unknown=X). It should be understood that each of the $^XB$'s may include more than one functionality $\beta$, e.g. in the instance where the desired product is a lactone ($\delta\approx$ester bond; $\beta$'s alcohol and acid, respectively).

Hence, the chemical reaction can generally be considered as the following transformation:

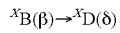

where the part of $^XB$ not being included in the functionality/functionalities $\beta$ is substantially preserved as the part of $^XD$ not being included in the functionality $\delta$. This being said, especially with due respect to the description further below, the chemical reaction is typically conducted under the influence of one or more chemical substances A. Such chemical substances A include a functionality $\alpha$ which is involved in the transformation of the $\beta$'s into $\delta$. The substance(s) A may be specific reagent(s) or may be a solvent which includes groups useful for facilitating the transformation above. This being said, the functionality $\alpha$ of A need not to be covalently coupled to the functionality $\beta$, although this will be the case in many instances.

Thus, in a more specific manner, the chemical reaction should be considered as the following transformation:

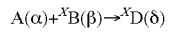

Thus, more specifically, the reaction involves one or more chemical species $^XB$ (i.e. starting material(s) selected by the user of the system wherein the chemical reaction is to be conducted) and resulting in a reaction product $^XD$ (e.g. the desired product) which includes a functionality $\delta$, where the chemical reaction involves one or more functionalities $\beta$ (e.g. a carboxylic acid functionality) in the $^XB$'s which are transformed into $\delta$ (e.g. an carboxylic ester functionality) in $^XD$.

In a specific illustrative example, the chemical species ($^XB$) may be cyclohexyl-1-carboxylic acid and the desired product ($^XD$) may be benzyl cyclohexyl-1-carboxylate, where the functionality $\beta$ included in $^XB$ is —COOH which is to be transformed to the ester —COOBn, thus, $\delta$ in $^XD$ is —COOBn. In this instance, A could be BnCl, i.e. $\alpha$=—Cl.

Another illustrative example is the oxidation of benzylalcohol to benzoic acid

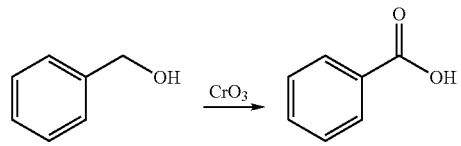

wherein B is benzyl alcohol with the hydroxyl group being the functionality $\beta$ and $CrO_3$ as the chemical substance A and benzoic acid being the product D with the carboxylic acid group as the functionality $\delta$.

As will be understood, the above simplified description of the reactions also include the possibility of including what could be considered as two (or more) substrates which in a coupling reaction are coupled to each other. In such instances, $^XB$ (the substrate) may actually include two substrates which are then separately or jointly treated with reagents under the conditions identified in the method and are brought together in order to form the coupled product ($^XD(\delta)$). In such instances, the functionality $\beta$ in both (or all) of the chemical species $^XB$ should be provided to the parameter selection unit.

An example of a transformation including two substrates (B's), namely $^XB'$ and $^XB''$ is

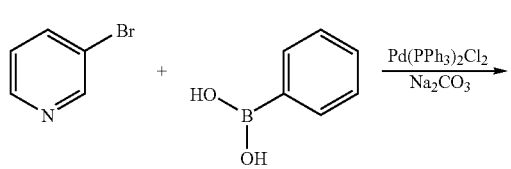

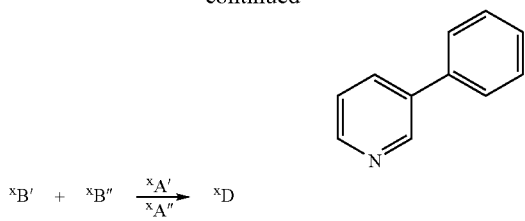

$$^XB' + {}^XB'' \xrightarrow[^XA'']{^XA'} {}^XD$$

in which 2-bromopyridine is $^XB'$ and the boronic acid is $^XB''$, $\beta'$ is Br and $\beta''$ is $B(OH)_2$, whereas $\delta$ is a single bond (!).

The R reactions are conducted in a system which provides energy for the chemical reactions. The term "provides energy" should be understood in the broadest sense, namely that the apparatus may be able to actively heat the reaction mixtures (see below) or the apparatus may simply be able to provide the correct conditions with respect to temperature (including cooling), pressure, atmosphere, etc. so that the reactions are energetically favoured and allowed to proceed according to the R sets of reaction parameters ($^X\Sigma_R$). This being said, preferred embodiments of the present invention are those where the apparatus provides energy to the reactions in the form of heat, in particular by heating with microwaves.

Besides including an apparatus for providing energy to the reaction, the system also includes a parameter selecting unit having a user interface and storage means for carrying a database. The parameter selecting unit preferably also comprises an apparatus control unit for communicating with the apparatus. The apparatus typically comprises liquid handler means for preparing the reaction mixtures and a reaction cavity for treating the reaction mixtures (providing the reaction conditions). In addition, the apparatus control unit may communicate with an analysis unit. The system is constructed so that the user interface, preferably a graphical user interface (GUI), is connected to the storage means via a search unit in order to be able to get access to the database. The storage means may be available directly in the form of a hard disk, CD-ROM, etc. or via the internet, a server network, or the like. The search in the database is preferably performed by a substructure search for a desired chemical reaction (transformation $A(\alpha)+{}^XB(\beta)\rightarrow{}^XD(\delta)$). The data retrieved from the server database may be edited in the apparatus control unit to fit the specification of the user or use directly, preferably without the intervention by the user. The apparatus control unit then preferably sends instructions to the liquid handler with information including all the steps needed for the reaction such as making stock solution, dilute, mix the reagent, mix, etc. The liquid handler can perform these steps using a robotic arm with a needle connected to a pump but could also be handled with valves and tubing. The robotic arm also has a gripper that is used for moving the samples into the reaction cavity, e.g. a microwave cavity. The apparatus control system also instructs to reaction cavity of the apparatus about reaction temperature, pressure, etc. The temperature and pressure in the reaction cavity may be measured during the treatment process. After (or during) the heating process, a sample from the reaction mixture may again be handled by the liquid handler and send to an analysis unit in order to follow the reaction. All the data generated from each unit may be send back to the storage means and stored for later use. Such data may be used for building up the database, for repeating reactions, etc. The user could also use the parameter selection unit as a office client via a network, web interface, through a firewall and via internet. The data could be stored on a server, hard disk, CD-ROM, etc.

The method of the present invention may be conducted in a semi-automated manner by utilising a computer program especially adapted for performing the steps of selecting the R sets of reaction parameters, preparing the R reaction mixtures and treating the R reaction mixtures, etc., i.e. facilitating the method described herein when performed in the system described above.

As described above, the treatment typically includes heating. Preferably, the reaction is a microwave facilitated chemical reaction, wherein treatment is application of microwaves to the reaction mixture. Such a reaction is preferably performed in a microwave reaction cavity of a microwave apparatus.

Such a microwave apparatus preferably comprises a controllable microwave generating and amplification means for providing microwaves to the reaction cavity. When such an apparatus is used, the application of microwaves is preferably controlled by the R selected set of reaction parameters via the controllable microwave generating and amplification means. One possible microwave apparatus to be utilised in connection with the present invention is described in WO 00/36880 which is hereby incorporated by reference.

With reference to the above, the method comprises the step of having the user to provide information to the user interface of the parameter selection unit about (at least) the functionality/functionalities $\beta$ in the chemical species $^XB$. Thus, as a minimal requirement, information about the functionality/functionalities $\beta$ in the chemical species $^XB$ should be provided to a parameter selection unit. Such information might be in the form of structural information about the functionality or information in the form of a code specifically referring to the functionality/functionalities $\beta$. Through the user interface module, it might be possible to either draw the chemical functionalities $\beta$ and even the partial (more than just the chemical functionality $\beta$) or substantially full chemical structure of the chemical species $^XB$. A user interface module providing this possibility can be made available by using standard software products, e.g. ISIS Draw, etc., used for graphical presentation of chemical structure, as such software products are able to present chemical structures in a standardised manner. Alternatively, the operator might select the functionality from a list of chemical functionalities provided via the user interface module.

It is preferred that at least a partial chemical structure (substructure) of $^XB$ is provided so as to make is possible for the parameter selection unit (via the search unit) to retrieve the most relevant sets of reaction parameters from the database (see below). In particular, the full chemical structure of $^XB$ is provided so as to ensure that other functionalities in $^XB$ are also taken into consideration.

The present method also comprises the step of having the user to provide information to the user interface of the parameter selection unit about the desired transformation of $\beta$ to $\delta$. This information can, as above for $\beta$, be given in the form of structural information about the functionality/functionalities $\delta$ or information in the form of a code specifically referring to the functionality $\delta$ or the specific transformation $\beta\rightarrow\delta$. The user may also select the desired transformation from a list of named reactions. Information about the partial or complete structure need not necessarily to be given as the part of $^XD$ not being $\delta$ normally is typically essentially identical to the part of $^XB$ not being $\beta$. Thus, if the full (or partial) structure of $^XB$ is already provided, information about the transformation, or simply about δ, is normally sufficient.

After the initial information is provided to the parameter selection unit via the user interface, the system will be able to conduct the R chemical reactions with only little or no user intervention. This is particularly true when a predefined kit is provided to the system.

The parameter selection unit is used for retrieving the R sets of reaction parameters from a database. Thus, the parameter selection unit preferably includes processing means for conducting the retrieval, processing/selection. A storage means (diskette, CD-ROM, semiconductor memory chip, etc.) for either permanent or temporary storage of data module is associated with the parameter selection unit. Also, the parameter selection unit can include a neural network sub-module for providing the option of maintaining the database with results of the reactions performed (preferably including yields), thereby giving the possibility facilitating a reaction optimisation process.

The method of the present invention utilises a database which comprises N sets of associated data, each of the N sets comprising (at least):
  i) a set of reaction parameters for a chemical reaction involving the transformation of one or more functionalities $^Nβ$ of chemical species $^NB$ into $^Nδ$ in a product $^ND$ under the influence of one or more chemical substances $^NA$, such chemical substance(s) each including a chemical functionality $^Nα$ being involved in the transformation of the functionality $^Nβ$ to the functionality $^Nα$; and
  ii) functional or structural information about the chemical species $^NB$.

The database might have one of many possible formats known to the person skilled in the art. In particular, several commercially available formats are possible, e.g. Beilstein Crossfire, Scifinder, ISIS/Base (Teilheimer, Spore, CIRX, Daylight). The database is provided on storage means, e.g. a diskette, a hard disk, a CD-ROM, a semiconductor memory chip, etc. In an interesting embodiment, the database is provided on storage means which is accessible via the internet. This possibility makes it possible for the user/customer (via the parameter selection unit) to have access (e.g. via an access code) to a database which is provided and maintained by a supplier.

As mentioned above, the database comprises N sets of "associated data". By the term "associated data" is meant that a series of data representing information about a chemical reaction is presented in the database in a way that will make it possible for the parameter selection unit to retrieve such data. One way of traditionally "organising" the database is to present the associated data in separate records, however, as the database also should comprise functional or structural information about the chemical species $^NB$, it is envisaged that a relational database often is more suitable.

The positive integer N is also used as a prefix for B, D, β, δ and A thereby indicating that specific B, D, β, δ and A's, respectively, are included in the n'th set (n being in the range of 1 to N) of associated data in the database. It will be apparent that N can be any positive integer, however preferably an integer of at least 4, such as at least 10, in particular at least 25. The total number of sets of associated data may be quite large, e.g. up to 1,000 or even up to 10,000. It should be understood that $^NB$ and $^ND$ in one sets of associated data can be the same as in another set of associated data. Actually, this situation simply implies that the same chemical reaction (the transformation $^NB→^ND$) has been performed under different conditions (e.g. involving different A's or different conditions). In particular, the N sets should also comprise sets of associated data corresponding to non-identical sets of $^NB$ and $^NB$, i.e. not all sets of associated data should relate to the same reaction B→D.

The N sets of associated data each comprise a set of reaction parameters for a chemical reaction involving the transformation of a functionality $^Nβ$ of a chemical species $^NB$ into $^Nδ$ in a product $^ND$ under the influence of a chemical substance $^NA$, such chemical substance including a chemical functionality $^Nα$ being involved in the transformation of the functionality $^Nβ$ to the functionality $^Nδ$. Thus, the chemical reactions for which data (sets of reaction parameters) are stored in the database can all be generalised as the transformation

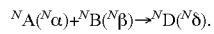

$$^NA(^Nα)+^NB(^Nβ)→^ND(^Nδ).$$

In the present context, the term "set of reaction parameters" is intended to mean a specific set of parameters which make it possible to conduct a chemical reaction in a reproducible manner. Typical examples of reaction parameters for chemical reactions are parameters with respect to temperature (i.e. temperature level, temperature cycles, etc.), pressure (i.e. initial pressure, maximum pressure, etc.), reaction time, reaction cycles, relative amounts of reactants, time of addition of reactants, etc. As will be apparent, the associated data may also include information about addition of necessary additional reagents and/or catalysts, etc. Although not mandatory, it will often be advantageous to include information about the yield or the pre-run reactions and optionally also the purity.

The set of reaction parameters may be presented either as the direct parameters (temperature, pressure, etc.) or may be presented as indirect parameters, i.e. control parameters for the apparatus (via the apparatus control unit) which is to provide energy for the chemical reaction. In the latter instance, the set of reaction parameters is typically presented as a control parameter protocol which will lead to the desired parameters with respect to temperature, pressure, etc. when used in the apparatus. In this instance, it is preferred that the set of reaction parameters also comprises information about the intended parameters with respect to temperature, pressure, etc. in that such additional information can be used to monitor the conducted reaction and, in a even more preferred embodiment, to slightly adjust the control parameters so as to obtain the desired reaction parameters.

Furthermore, it should also be understood that a set of reaction parameters may allow the person in control of the system or an computer associated with the system (e.g. a computer comprising a trained neural network for optimising the reaction conditions) to alter the set of reaction parameters if desirable. However, preferably the parameter selection unit should work without user intervention except where information is required as described for the invention.

The N sets of associated data also each comprises functional and/or structural information about the chemical species $^NB$. As the minimal information in this regard, information about the functionality $^Nβ$ should be given (functional information). As mentioned above, further information about the partial or full chemical structure (structural information) is preferably also given in order to make it possible to compare the chemical structure of the $^NB$'s and $^XB$. This will, as mentioned above, make it possible to take into consideration the impact of other potentially reactive functionalities within $^XB$.

The N sets of associated data preferably also comprises information about the functionality δ, and more preferably also information about the chemical substances $^N$A, in particular the functionality $^N\alpha$, but more preferred also further partial or full structural information.

In a preferred embodiment, none of the N sets of associated data in the database exactly correspond to a transformation of $^X$B into $^X$D. This means that the desired reaction (involving the transformation of a specific $^X$B to a specific $^X$D) has not been performed in advance, and the full impact of the present invention with respect to retrieval and selection can then be exploited.

The method also comprises the further step of allowing the parameter selection unit to retrieve R sets of associated data ($\Sigma_R$) from the database, such sets of associated data being selected so that the functionality $^N\beta$ in each set of associated data is essentially identical to the functionality/functionalities $\beta$ in $^X$B and the functionality $^N\delta$ is essentially identical to $\delta$ in the product $^X$D. The term "essentially identical" indicates that the functionalities taken as such should be structurally identical, but that certain differences might appear, especially with respect to reactivity (electron distribution, sterical hindrance, etc.).

It will be apparent that the provided information about $^X\beta$ and $^X\delta$ should preferably have the same level of specificity as the information about $^N\beta$ and $^N\delta$. This should be taken into consideration when constructing the parameter selection unit and building the database.

It is envisaged that the result of the desired reaction (or reactions in an optimisation procedure) can be provided to the database so as to extend the knowledge accumulated. In connection herewith, it is relevant to provide information about the yield and optionally also about the purity.

It should also be understood that the parameter selection unit retrieves more than one set of reaction parameters (R>1). It will be apparent that R can be any positive integer (R<=N). The positive integer R is also used as a prefix thereby referring to the r'th set (r being in the range of 1 to R) of retrieved data. The R sets of associated data ($\tau_R$) are retrieved in order to obtain the R sets of reaction parameters ($^X\Sigma_R$).

As will be apparent from the following, R (R>1) sets of reaction parameters are selected, thereby making it possible to conduct R chemical reactions under fairly realistically reaction conditions with the aim of identifying the best possible conditions for the transformation in question and optionally with the aim of further optimising the reaction conditions. As will be apparent, such an optimisation procedure may be conducted in an iterative manner.

In the present method, it is typically preferred that the reaction of $^X$B to give the product $^X$D under the conditions defined by the sets of reaction parameters ($^X\Sigma_R$) requires the influence of corresponding chemical substances $A_R$, where such chemical substances $A_R$ including a chemical functionality $\alpha_R$ being involved in the transformation of the functionality $\beta$ to the functionality $\delta$. In this preferred variant, it is thus important that the R sets of reaction parameters also comprise information about which specific $A_R$'s are required.

The chemical substances $A_R$ should be selected so that the functionalities $\alpha_R$ thereof resemble the functionalities $^N\alpha$ of the chemical substances $^N$A retrieved as in the R sets of associated data ($\Sigma_R$). Thus, the reagents proposed with the R sets of reaction parameters should be of the same type as the ones used in the pre-run reactions represented in the database. ($\alpha_R \cong {}^N\alpha$).

Thus, preferable, the R sets of reaction parameters ($^X\Sigma_R$) are accompanied by corresponding information about the chemical substances $A_R$ under which influence the R reactions should be conducted. Such information should, beside the information about the functionality or (full or partial) structure of the $A_R$'s, also comprise information about the amount of chemical substance (number of equivalents), time of addition, etc.

This, being said, it is also preferred that the R sets of associated data which are to be retrieved from the database also include information about any additional constituents involved in the chemical reaction involving the transformation of a functionality $^N\beta$ of a chemical species $^N$B into a $^N\delta$ in a product $^N$D under the influence of a chemical substance $^N$A. Such additional constituents may include catalysts, additional reagents, solvents, reactive gasses, inert atmospheres, etc. In connection therewith, it is of course particularly relevant that the R sets of reaction parameters ($^X\Sigma_R$) are accompanied by information about any such additional constituents involved in the chemical reaction.

In the method according to the invention, chemical substances $A_R$ are preferably reagents. In one embodiment, the chemical substances $A_R$ are immobilised.

It is envisaged that the retrieved R sets of reaction parameters are selected so as to provide a set of reaction parameters based on the best (sub)structural match between $^X$B (or the $^X$B's) and the $^N$B's in $\Sigma_Q$, i.e. one set of reaction parameters corresponding to a pre-run reaction which included a similar chemical species.

The terms "structural match" and "structural similarity" refer to comparative measure which can be performed by available software products incorporated in or collaborating with the parameter selection unit. It should be understood that structural similarity or structural match can also be based on a preselected substructure of the molecule. This is apparent as the information provided to the parameter selection unit may be limited to a substructure of $^X$B. In order for the parameter selection unit to perform the comparison, one of a number of possible commercial software products can be associated with the parameter selection unit. Examples hereof are ISIS/Base and Beilstein Crossfire and Scifinder as well as several molecular modelling software packages.

In a preferred embodiment, the retrieved R sets are simply used directly as parameters in the R sets of reaction parameters, preferably by using $A_R$'s having the same functionalities $\alpha_R$ as the functionalities $^N\alpha$ in the corresponding reaction.

Preferably, the R sets of reaction parameters involves the use of more than one chemical substance $A_R$. In this manner, various types of chemical substances (e.g. reagents) can be tested under various conditions in an optimisation process (R reactions). In particular, when an initial optimisation process is conducted in order to identify a chemical substance A to be used in a subsequent optimisation process, the R sets of reaction parameters involves the use of R chemical substances $A_R$. It will be appreciated that various interesting variants exist within this embodiment. It should be understood, that in the cases where various A's are to be tested, the R sets of reaction parameters should include such information. In one variant, the R sets involve a few A's in combination with a number of different solvent, catalysts, temperature profiles, etc. thereby yielding a complete set for optimisation suggestions.

When the R sets of reaction parameters are selected, the array of R reaction mixtures each comprising a predetermined amount of the chemical substance $A_R$ and the chemical species $^X$B and any additional constituents required is prepared according to the sets of reaction parameters. It should be understood that the user intervention in connection with this method step normally is limited to (i) providing the substrate ($^XB$) (or substrates) in a suitable form, e.g. in solid or liquid or dissolved form in a vial, and (ii) providing the necessary reagents (chemical substances), solvents, catalysts, etc. The latter step is preferably effected by means of a kit in which the necessary constituents are provided in separate vials which can be handled by the handling means of the system. This being said, it is preferred that the R sets of reaction parameters provides sufficient information to the system so that user intervention is reduced or, preferably, eliminated.

Thus in preferred embodiment, the array of R reaction mixtures is prepared by combining the chemical species $^XB$ with the content of one or more of P containers each comprising a chemical substance $A_R$ including a chemical functionality $\alpha_R$ which is intended to facilitate the transformation of a functionality $\beta$ to a functionality $\delta$ in a chemical reaction involving a chemical species $^XB$.

After the array of R reaction mixtures is provided, each of the R reaction mixtures are treated in the apparatus, more specifically in the reaction cavity, in accordance with the corresponding set of reaction parameters. The reaction mixture(s) are typically placed in the reaction cavity by the liquid handler means.

The R reactions can be performed sequentially or, alternatively, substantially simultaneously. In a particularly interesting embodiment treatment of the R reactions is performed substantially simultaneously. In both instances, it is preferred that the user intervention is eliminated.

The reaction mixtures can be placed directly in the reaction cavity of apparatus where reaction is effected, but the sample is typically placed in an open or closed sample holder or vial. This sample holder or vial can be an integral part of the reaction cavity or a separate reaction vessel of any material suitable for treatment under the conditions defined by the reactions parameters, e.g. microwave heating applications. For microwave heating, it will be known to the person skilled in the art that the material constituting the sample holder should preferably not absorb the microwave energy. Various types of polymers and glasses can advantageously be used. Specifically, various types of trays, microtiter plates, etc. can preferably be used when a plurality of samples are heated simultaneously. In order to avoid contamination, the sample holder or vial preferably includes a lid.

The free space in the reaction cavity can be filled with an inert gas in order to avoid reaction between ambient gasses and the sample. It is however preferred that the sample holder includes a lid.

The reaction cavity should preferably be able to sustain high internal pressure either caused by the chemical reaction or intentionally to create a high-pressure atmosphere as a reaction parameter. High internal pressure is normally used as a method to increase the temperature in the reaction vessel over the boiling point for the liquid phase in the reaction vessel. The pressure can be kept at a predetermined level or pre-set as a level not to be exceeded or fall below. The pressure system incorporates a safety valve function for protection of the pressurised components and personal safety of the operator.

The Kit

In view of the above, the present invention also provides a kit for use in the method, such a kit is defined in claim 12. The kit preferably also comprises additional constituents required for the transformation.

The kit is particularly useful in that predispensed amounts of various chemical substances can be provided.

It should be understood that the parameters, symbols, etc. have the meaning defined above. The positive integer P indicates the number of different chemical substances to be used in the R reactions. P is typically >1, such as >3. It should be understood that one chemical substance may be used in several reactions within the method for optimising reaction conditions (thus, P<=R).

The kit is preferably disposable so that the constituents thereof is only used in a series of R chemical reactions. Thus, the method typically involves that the kit for the R chemical reactions is provided. The kit is typically disposed after the R reaction mixtures are prepared.

The System

The present invention also relates to a system as defined in claim 14. Such a system is illustrated in FIG. 1. The system may also comprise one or more disposable kits comprising P containers each comprising a chemical substance $A_R$ including a chemical functionality $\alpha_R$ which is intended to facilitate the transformation of the functionality $\beta$ to the functionality $\delta$ in the chemical reaction.

The apparatus of the system is preferably a microwave apparatus, i.e. the reaction cavity is a microwave reaction cavity.

The system defined herein is particularly useful for use in the method defined herein.

Software

The present invention also relates to a computer readable data carrier loaded with a computer program system for facilitating the method defined herein in the system defined herein, said computer program system comprising:

retrieving information via the user interface of the parameter selection unit about the functionality/functionalities $\beta$ in the chemical species $^XB$;

retrieving information via the user interface of the parameter selection unit about the desired transformation of $\beta$ to $\delta$;

retrieving, via the parameter selection unit, R sets of associated data ($\Sigma_R$) from the database, such sets of associated data being selected so that the functionality/functionalities $^N\beta$ in each set of associated data is/are essentially identical to the functionality/functionalities $\beta$ in $^XB$ and the functionality $^{MN}\delta$ is essentially identical to $\delta$ in the product $^XD$, in order to obtain the R sets of reaction parameters ($^X\Sigma_R$), said R sets of reaction parameters ($^X\Sigma_R$) being accompanied by corresponding information about the chemical substance(s) $A_R$ under which influence the R reactions should be conducted and information about any additional constituents involved in the chemical reaction;

providing instructions to the liquid handler about the preparation of an array of R reaction mixtures each comprising a predetermined amount of the chemical substance(s) $A_R$ and the chemical species $^XB$ and any additional constituents required according to the sets of reaction parameters;

providing instructions to the reaction cavity about treatment of each of the R reaction mixtures in the apparatus in accordance with the corresponding set of reaction parameters.

Figure 3:
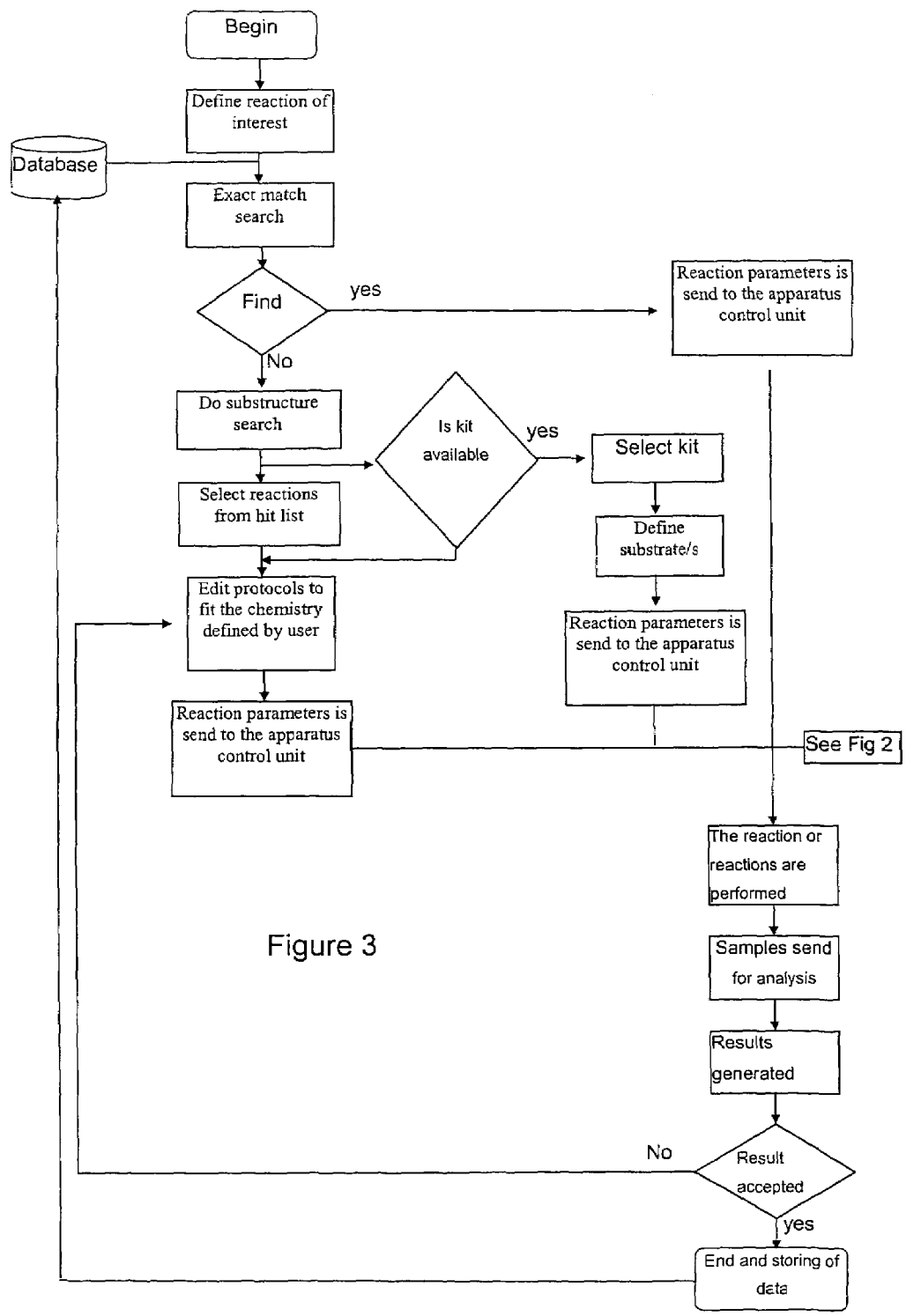

The functionality of the computer program is illustrated in FIG. 3. The computer readable data carrier can be of any format, e.g. a CD-ROM, a hard disk, a floppy disk, RAM, etc.

The invention should furthermore be understood in view of the following non-limiting examples.

EXAMPLES

The experiments illustrated in the following are feasible within a system as illustrated in FIG. 1.

An illustrative example is given in the following:

The following product is to be synthesised in the system of the invention.

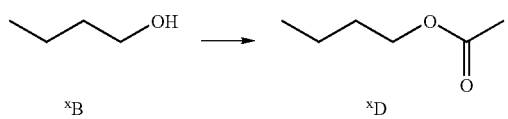

The first step in the method is to provide information to the user interface (i) about the functionality β (—OH) and (ii) about the desired transformation of β to δ (—OH→—O-Acetyl, i.e. acetylation of an alcohol). The user also provides information to the user interface about the full structure of $^XB$ (n-butanol) or the partial structure of $^XB$ (—CH$_2$—OH; i.e. primary alcohol).

The database comprises N sets of associated data, i.a. data for the transformation hydroxy groups ($^N$β) of various chemical species ($^N$B) into the acetylated derivative. The database includes associated data for primary, secondary and tertiary alcohols as substrates.

If only the functionality β is provided by the user, the search unit can retrieve the R sets of data among all sets of associated data defining β as an alcohol and defining the transformation, β→δ, as the conversion of an alcohol to the acetylated derivative.

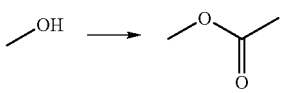

If on the other hand, the user has provide information about the full or partial structure of $^XB$, i.e. information about the fact that $^XB$ is a primary alcohol, it will be possible for the search unit to retrieve the R sets of associated data corresponding to R sets of data among the associated data in which $^N$β is a primary alcohol.

In the database, it is assumed that several hits relating to different A, catalyst, solvent, reaction profile etc. are obtained. As an option, it is possible to indicate in a hit list whether the additional constituents called for by the R' sets are available chemicals. This will often reduce the number of hits (R) retrieved by the search unit. Another possibility is to reduce the number of hits by setting a yield threshold, or a reaction time threshold, etc. This procedure will reduce the number of R sets of reaction parameters ($^X\Sigma_R$). Also, it will be possible to set an upper limit for the number R.

As above, the next step could be to reduce the number of hits by checking the availability of the chemicals called for. In a preferred embodiment, the retrieved R sets of reaction parameters corresponds to a commercially available, disposable reaction kit comprising reagents, preferably include additional constituents, for the R reactions.

The R sets of reaction parameters can then be used directly by transferring the data to the apparatus control unit, optionally after priori user modification (normally not preferred). Reagent A could be change, change of reaction temperature, reaction times etc. The information that is transferred to the apparatus control unit will include information for making stock solution, reagent mixing, reaction temperature, etc. The instrument then execute the reaction according to the protocol. After each of the R reactions, a sample for analysis of the reaction mixture can be transferred to a analysis tool such as LC/MS, GC/MS, flow-through probe NMR, etc. The data from all different part will be collected in the database server and can be use again for reproducibility.

Figure 2:
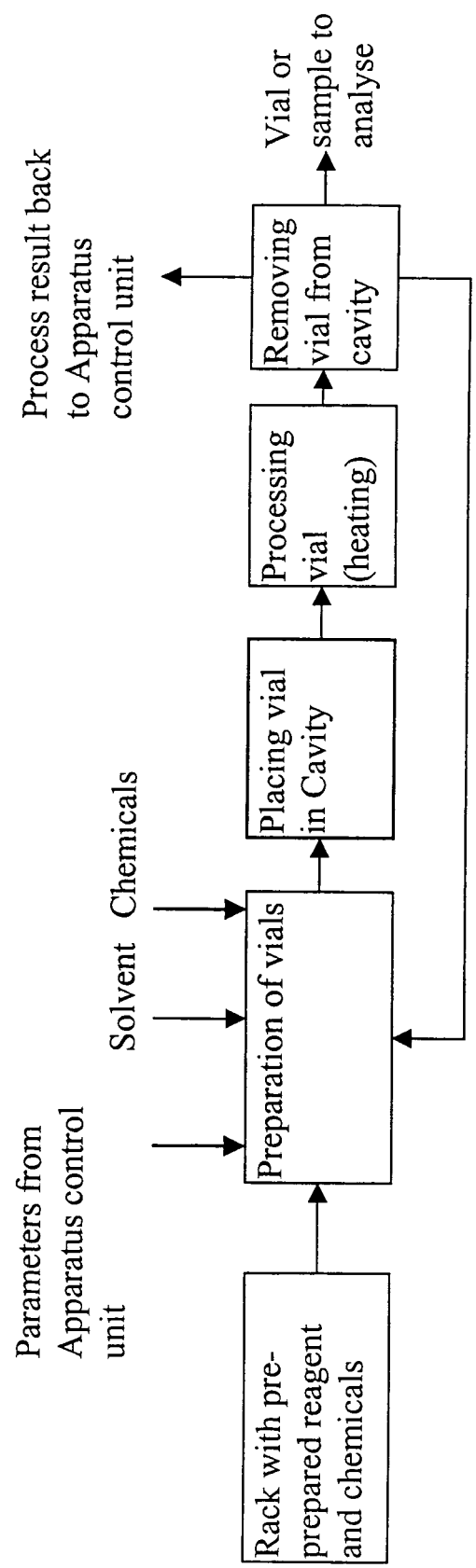

The preparation of reaction mixtures and treatment according to reaction mixtures is illustrated in FIG. 2.

Example 2

The following product is to be synthesised in the system of the invention

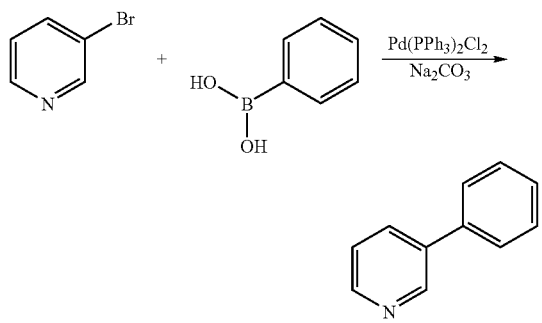

In this reaction one could search for the transformation of the functionality β in B" to the functionality δ in product D. To reduce the number of hits the user could search for a specific product D in combination with the functionality β. One could also search for reactions including both the functionalities β in both B' and B". One could also search with any of the functionalities β in both B' or B" in combination of A's and/or the functionality α's. If A is palladium the search will be limited the to Suzuki, Negishi etc. type of reactions. The number of hits could then also be limited as described above.

For a number a chemical transformation were there is a kit available the user will instead be able to retrieve a number of R sets of preselected reaction parameters. For the example above the user will describe the structure of the chosen substrate. The software then generate the protocols from predefined reaction parameters. The user than add the kit into the apparatus at a predefine position and start the run.

The invention claimed is:

1. A method of conducting R chemical reactions, where R is a positive integer, in a system which includes an apparatus which provides energy for the chemical reactions, said system also including a parameter selecting unit having a user interface and storage means for carrying a database, said chemical reaction involving one or more chemical species $^XB$ and resulting in a reaction product $^XD$ which includes a functionality δ, where the chemical reaction involves one or more functionalities β in the $^XB$'s which are transformed into δ in $^XD$, each reaction being performed under the influence of one or more corresponding chemical substances $A_R$, such chemical substances $A_R$ including a chemical functionality $α_R$ being involved in the transformation of the functionality/functionalities β to the functionality δ, said database comprising N sets of associated data, each of the N sets comprising:

i) a set of reaction parameters for a chemical reaction involving the transformation of one or more functionalities $^N\delta$ of chemical species $^NB$ into $^N\delta$ in a product $^ND$ under the influence of one or more chemical substances $^NA$, such chemical substance(s) each including a chemical functionality $^N\alpha$ being involved in the transformation of the functionality $^N\delta$ to the functionality $^N\delta$; and ii) functional or structural information about the chemical species $^NB$;

the method comprising:

providing information to the user interface of the parameter selection unit about the functionality/functionalities $\delta$ in the chemical species $^XB$;

providing information to the user interface of the parameter selection unit about the desired transformation of $\beta$ to $\delta$; retrieving R sets of associated data ($\Sigma_R$) from the database in the parameter selection unit without user interface, such sets of associated data being selected so that the functionality/functionalities $^N\beta$ in each set of associated data is/are essentially identical to the functionality/functionalities $\beta$ in $^XB$ and the functionality $^N\delta$ is essentially identical to $\delta$ in the product $^XD$, in order to obtain the R sets of reaction parameters ($^X\Sigma_R$), said R sets of reaction parameters ($^X\Sigma_R$) being accompanied by corresponding information about the chemical substance(s) $A_R$ under which influence the R reactions should be conducted and information about any additional constituents involved in the chemical reaction;

preparing an array of R reaction mixtures each comprising a predetermined amount of the chemical substance(s) $A_R$ and the chemical species $^XB$ and any additional constituents required according to the sets of reaction parameters; and treating each of the R reaction mixtures in the apparatus in accordance with the corresponding set of reaction parameters in order to conduct the R chemical reactions.

2. The method according to claim 1, wherein the array of R reaction mixtures is provided from $^XB$ stock solution(s) and a kit comprising stock solutions of the chemical substance(s) $A_R$ and any additional constituents required.

3. The method according to claim 1, wherein the R sets of reaction parameters involves the use of more than one chemical substance $A_R$.

4. The A-method according to claim 1, wherein the R sets of reaction parameters involves the use of R chemical substances $A_R$.

5. The method according to claim 1, in which the array of R reaction mixtures is prepared by combining the chemical species $^XB$ with the content of one or more of P containers each comprising a chemical substance $A_R$ including a chemical functionality $\alpha_R$ which is intended to facilitate the transformation of a functionality $\beta$ to a functionality $\delta$ in a chemical reaction involving a chemical species $^XB$.

6. The method according to claim 1, wherein the R sets of reaction parameters are provided in the form of control parameters for the apparatus.

7. The method according to claim 1, wherein treatment of the R reactions is performed substantially simultaneously.

8. The method according to claim 1, wherein treatment of the R reactions is performed sequentially.

9. The method according to claim 1, wherein the treatment includes heating.

10. The method according to claim 1, wherein the reaction is a microwave facilitated chemical reaction.

11. The method according to claim 1, wherein the apparatus comprises a microwave reaction cavity.

* * * * *